US009205636B2

(12) United States Patent
Backer et al.

(10) Patent No.: US 9,205,636 B2
(45) Date of Patent: Dec. 8, 2015

(54) PROCESS FOR PRODUCING LAMINATES OF UNIDIRECTIONALLY ARRANGED POLYMERIC TAPES

(71) Applicant: NOVAMEER B.V., Veghel (NL)

(72) Inventors: Jan Adolph Dam Backer, Son en Breugel (NL); Bart Clemens Kranz, Uden (NL)

(73) Assignee: NOVAMEER B.V., Veghel (NL)

( * ) Notice: Subject to any disclaimer, the term of this patent is extended or adjusted under 35 U.S.C. 154(b) by 168 days.

(21) Appl. No.: 13/925,939

(22) Filed: Jun. 25, 2013

(65) Prior Publication Data
US 2013/0284365 A1    Oct. 31, 2013

Related U.S. Application Data

(62) Division of application No. 13/437,540, filed on Apr. 2, 2012, now Pat. No. 8,497,008, which is a division of application No. 12/311,458, filed as application No. PCT/EP2007/008495 on Sep. 29, 2007, now Pat. No. 8,168,022.

(30) Foreign Application Priority Data

Oct. 5, 2006    (EP) ..................................... 06020909

(51) Int. Cl.
*B32B 37/14*    (2006.01)
*B29C 70/08*    (2006.01)
(Continued)

(52) U.S. Cl.
CPC ............... *B32B 37/14* (2013.01); *B29C 70/086* (2013.01); *B32B 3/10* (2013.01); *F41H 5/04* (2013.01);
(Continued)

(58) Field of Classification Search
CPC .............. A61F 13/15593; B32B 27/00; Y10T 152/10072; Y10T 152/10099
USPC .......................................... 156/182, 160, 163
See application file for complete search history.

(56) References Cited

U.S. PATENT DOCUMENTS

| 4,309,487 A | 1/1982 | Holmes |
| 5,578,370 A | 11/1996 | Ferrar et al. |

(Continued)

FOREIGN PATENT DOCUMENTS

| EP | 0 776 762 B1 | 6/1997 |
| EP | 1 403 038 A1 | 3/2004 |

(Continued)

OTHER PUBLICATIONS

Jordan et al.; "The development of morphology during hot compaction of Tensylon high-modulus polyethylene tapes and woven cloths;" *Polymer*; Jun. 2002; pp. 3397-3404; vol. 43—No. 12; Elsevier Science Publishers B.V.; United Kingdom.

(Continued)

*Primary Examiner* — Brent O'Hern
(74) *Attorney, Agent, or Firm* — Oliff PLC

(57) ABSTRACT

Process for producing a laminate being built of at least two monolayers of polymeric tapes,
the polymeric tapes having a tensile strength of at least 200 MPa, said process comprises the steps of
 forming a first monolayer of polymeric tapes by pre-tensioning the polymeric tapes and subsequently positioning the polymeric tapes under tension in a unidirectional, parallel manner,
 forming at least a second monolayer over the first monolayer in the same manner the first monolayer is formed, thereby
 stacking the at least two monolayers of polymeric tapes in such a way that the direction of the polymeric tapes is the same in every monolayer and that the polymeric tapes of each monolayer are offset to the tapes of the adjoining monolayer above or below that monolayer
 consolidating the thus stacked monolayers of polymeric tapes to obtain a laminate.

1 Claim, 3 Drawing Sheets

(51) Int. Cl.
  *B32B 3/10* (2006.01)
  *F41H 5/04* (2006.01)
  *B29L 31/00* (2006.01)

(52) U.S. Cl.
  CPC ......... *B29L 2031/768* (2013.01); *F41H 5/0478* (2013.01); *Y10T 156/1002* (2015.01); *Y10T 428/24074* (2015.01); *Y10T 428/2495* (2015.01); *Y10T 428/24132* (2015.01); *Y10T 428/24479* (2015.01); *Y10T 428/2913* (2015.01)

(56) References Cited

U.S. PATENT DOCUMENTS

| | | |
|---|---|---|
| 2006/0210749 A1 | 9/2006 | Geva et al. |
| 2007/0071942 A1 | 3/2007 | Callaway et al. |

FOREIGN PATENT DOCUMENTS

| | | | |
|---|---|---|---|
| EP | 1 479 498 A1 | 11/2004 | |
| EP | 1 627 719 A1 | 2/2006 | |
| WO | WO 2006/107197 A1 | 10/2006 | |

OTHER PUBLICATIONS

Hine et al.; "A comparison of the hot-compaction behavior of oriented, high-modulus, polyethylene fibers and tapes;" *Journal of Macromolecular Science Part B. Physics*; 2001; pp. 959-989; vol. B40—No. 5; Marcel Dekker Inc., New York, NY.

Ward et al.; "The science and technology of hot compaction;" *Polymer*; Mar. 2004; pp. 1413-1427; vol. 45—No. 5; Elsevier Science Publishers B.V.; United Kingdom.

Alcock et al.; "The mechanical properties of unidirectional all-polypropylene composites;" *Composites Part A: Applied Science and Manufacturing*; May 2006; pp. 716-726; vol. 37—No. 5; Elsevier Science Publishers B.V.; Amsterdam, The Netherlands.

Loos et al.; "Morphological investigations of polypropylene single-fibre reinforced polypropylene model composites;" *Polymer*; Apr. 2001; pp. 3827-3834; vol. 42—No. 8; Elsevier Science Publishers B.V.; United Kingdom.

a)

b)

c)

d)

e)

PROCESS FOR PRODUCING LAMINATES OF UNIDIRECTIONALLY ARRANGED POLYMERIC TAPES

CROSS REFERENCE TO RELATED APPLICATIONS

This is a Division of application Ser. No. 13/437,540, filed Apr. 2, 2012, now U.S. Pat. No. 8,497,008, which is a Division of application Ser. No. 12/311,458, filed Mar. 31, 2009, now U.S. Pat. No. 8,168,022, which in turn is a National Phase of Application No. PCT/EP2007/008495 filed Sep. 29, 2007, which claims benefit of European Patent Application No. 06020909.5 filed Oct. 5, 2006. The disclosure of the prior applications is hereby incorporated by reference herein in its entirety.

BACKGROUND

The present invention relates to a process for producing a laminate being built of at least two monolayers of polymeric tapes, a laminate being built of at least two monolayers of polymeric tapes and a panel made of the laminates according to the invention.

Laminates comprising polymeric tapes in multiple layers are known in the art. U.S. Pat. No. 5,578,370 discloses a mat of mutually intersecting elongate elements. The elongated elements may be produced from a polymeric film coated on both sides with a polymeric material having a lower softening temperature range than the middle, i.e. central layer. The thus obtained composite film is slit to form elongate elements in the form of tapes. The mat is then formed with the tapes by weaving, knitting or by laying down of a fibrous web. The mat is consolidated by heating the mat to fuse the tapes at least at their intersections. Prior to fusion a stack of two or more mats may be formed to obtain a product comprising at least two woven or knitted mats.

EP 1 627 719 discloses a multilayered polyethylene material and ballistic articles manufactured therefrom. The multilayered material comprises a plurality of monolayers of unidirectionally oriented polyethylene strips. The monolayers are crossplied at an angle with respect to each other. Before a second monolayer is formed over the first monolayer, the first monolayer is consolidated by applying pressure and heat. After aligning the strips of the second monolayer at an angle to the first monolayer a bilayered mat is formed by again applying pressure and heat. A multilayered material may be obtained by consolidating at least two bilayered materials obtained as described above.

EP 1 403 038 discloses a method for reinforcing an article by attaching to at least one surface of said article a tape, film or yarn. The tape, film or yarn can be formed of any drawn thermoplastic material. A drawn thermoplastic polymer of the AB or ABA type is preferred. The tape, film or yarn of the AB or ABA type is used in a form where the tape, film or yarn are at angle to each other.

The tapes according to prior art are therefore formed into a woven, nonwoven or knitted fabric. As an alternative the tapes are formed in unidirectional monolayers where the monolayers are crossplied at an angle to each other. The latter method makes consolidation of each individual monolayer necessary.

SUMMARY

It is therefore an object of the present invention to at least reduce the disadvantages of the prior art and to provide a process that allows simple production of multilayered articles.

This object is achieved by a process for producing a laminate being built of at least two monolayers of polymeric tapes, the polymeric tapes having a tensile strength of at least 200 MPa, said process comprises the steps of
- forming a first monolayer of polymeric tapes by pre-tensioning the polymeric tapes and subsequently positioning the polymeric tapes under tension in a unidirectional, parallel manner,
- forming at least a second monolayer over the first monolayer in the same manner the first monolayer is formed, thereby
- stacking the at least two monolayers of polymeric tapes in such a way that the direction of the polymeric tapes is the same in every monolayer and that the polymeric tapes of each monolayer are offset to the tapes of the adjoining monolayer above or below that monolayer
- consolidating the thus stacked monolayers of polymeric tapes to obtain a laminate.

DETAILED DESCRIPTION

Due to distortions in the polymeric material of the tapes multilayered articles could so far only be formed by consolidating each layer of tapes or by a weaving process which fixes the tapes in a desired position. Surprisingly it could be shown that the process according to the present invention allows production of a laminate being built of at least two monolayers of polymeric tapes without the need for consolidating each layer of tapes and yet obtain a laminate with essentially the same properties than the multilayered articles produced by prior art processes.

It should be noted that the laminate according to the present invention may comprise more than 2, e.g. 3, 4 or up to 25, even up to 50 or up to 100 monolayers of polymeric tapes all stacked in such a way that the direction of the polymeric tapes is the same in every monolayer and that the polymeric tapes of each monolayer are offset to the tapes of the adjoining monolayer above or below that monolayer The number of tapes per monolayer depends on the width of the tapes. It may be e.g. up to 10, up to 100, up to 1000 but also up to 10.000 or more.

Consolidation of the stacked monolayers is carried out in a manner known to the person skilled in the art by applying pressure and heat to the stacked monolayers, e.g. by thermocalendering.

The tapes of each layer are arranged in a parallel, i.e. side by side relationship and the direction of the tapes is the same in every monolayer. The monolayers are not cross-plied at an angle with respect to each other.

The monolayers are so stacked that the tapes of each layer are offset to the tapes of the adjoining monolayer above or below that layer. Thus, the joints between adjacent tapes of one monolayer are completely covered by the tapes of the adjoining monolayer above or below that layer.

It is preferred that each polymeric tape of one monolayer abuts against the tape that is positioned adjacent thereto. Due to unavoidable tolerances with regard to the width of the tapes, in some areas of the monolayer the tapes may be spaced apart. The interspaces, however, should always be smaller than the width of the polymeric tapes so that the interspaces are completely covered by the tapes of the monolayer above or below that monolayer.

In a special embodiment of the process according to the present invention positioning may also be carried out by arranging the polymeric tapes parallel to each other, each polymeric tape of one monolayer having an overlap with the polymeric tape that is positioned adjacent thereto. In order to obtain laminates with a smooth surface such positioning should only be used with relatively thin and flexible tapes.

The tensile strength of the polymeric tapes is measured in accordance with ASTM D638.

It is preferred that the tapes used for a process according to the present invention have a tensile strength of at least 400 MPa, more preferably the polymeric tapes have a tensile strength of at least 800 MPa. Depending on the polymeric material and the draw ratio the polymeric tapes may exhibit a tensile strength of up to 20 GPa or more.

It is further preferred that the polymeric tapes used for a process according to the present invention have a tensile modulus of at least 4 GPa, preferably at least 8 GPa and more preferably at least 16 GPa and most preferably at least 40 GPa. The polymeric tapes used for a process according to the present invention may have a tensile modulus of up to 180 GPa.

The tensile modulus of the polymeric tapes is measured in accordance with ASTM D790.

In another preferred embodiment of the process according to the present invention the polymeric tapes are made up of a polymeric material with a lower melting point and of a polymeric material with a higher melting point. The polymeric tapes comprise at least 80% of polymeric material. Consolidating is carried out at a temperature above the melting point of the polymeric material with the lower melting point and below the melting of the material with the higher melting point. The polymeric material with the lower melting point softens or melts during consolidation and thus bonds the polymeric tapes.

The lower melting point may be in the range of 55-250° C., the higher melting point may be in the range of 90° C.-350° C.

It is especially preferred that the polymeric material with the lower melting point surrounds the polymeric material with the higher melting point to obtain optimal bonding between adjacent tapes. Such structures are known as sheath core structures. The sheath may be applied to the core material, e.g. if monofilaments are used as tapes, by melt spinning the sheath along with the core material.

The sheath material could also be applied to the core material in a later step preferably before pretensioning or positioning, e.g. with a doctor blade, by spraying, powder coating or leading the tapes through a polymer solution, dispersion or emulsion and the like. The sheath could also be applied to the core material after pretensioning or positioning of a monolayer e.g. by leading individual or tapes positioned in a monolayer through a bath containing the sheath material.

The ratio of sheath material to core material ranges from 0.5/99.5 to 50/50 wt %.

It is in particular preferable if the core material and the sheath material are made of the same polymer, said sheath material in particular being a copolymer, and the core material in particular being a drawn homopolymer.

Said core material and said sheath material in particular being selected from the group consisting of polyethylene, ultra high molecular weight polyethylene, polypropylene, polyamide, polybutadiene terephthalate and polyethylene terephthalate, polyethylene naphtalate, polyvinyl alcohol, polyphenylidensulfide, copolymers of these polymers and mixtures thereof.

In addition the sheath material may be selected from the group consisting of ethylene alkyl acrylate copolymer (EAA), ethylene vinyl acetate copolymer (EVA), ethylenebutyl acrylate copolymer (EBA), ethylenemethyl acrylate copolymer (EMA), linear low density polyethylene (LL-DPE), high density polyethylenes (HDPE), low density polyethylenes (LPDE). It is also possible to use polyisobutylene (PIB) or polyurethane (PU) as sheath material. These polymers can be very flexible and may show high elongation. The sheath material may comprise one of the listed materials or mixtures of the listed sheath materials.

Before applying the sheath material onto the core material of the polymeric tapes a primer may be applied on the core surface as an adhesion promoter. Such a surface treatment of the core enhances bonding between core and sheath material. A suitable primer may be e.g. chlorinated polypropylene. An additional effect of a primer is less fibrillating of the tapes in the subsequent processing steps. Other surface treatments that can be used to enhance bonding between core and sheath material include plasma or corona treatment.

The polymeric tapes used in the process according to the invention may be spun monofilaments. The term monofilament as used herein encompasses any single filament spun individually, e.g. by melt spinning or gel spinning.

Tapes could also be made in a solid state extrusion (SSE) or skived from solid material followed by post drawing.

The polymeric tapes used in the process according to the invention may also be prepared by cutting or slitting a polymer film. The polymer film may be calendered, drawn or even overdrawn to achieve the necessary tensile strength.

One or both surfaces of a polymer film may be coated with a resin having a lower melting point than the base polymer. Such tapes are known in the art and disclosed e.g. in EP 0 776 762 B1 where firstly a two or a three layer film is produced by co-extrusion and subsequently cut into tapes. Two layer tapes are of the so called AB type and three layer tapes are of the ABA type. Bonding of the resin having a lower melting point than the base polymer to the base polymer may be enhanced by surface treatment of the base polymer with a primer e.g. chlorinated polypropylene. Other surface treatments include plasma or corona treatment.

In a preferred embodiment of the process according to the present invention the polymeric tapes may therefore have a layered structure with alternating layers of a polymeric material with a lower melting point and a polymeric material with a higher melting point. Bonding of the tapes may therefore occur by melting the polymeric material with a lower melting point.

The alternating layers of a polymeric material with a lower melting point and a polymeric material with a higher melting point may be chosen from the group consisting of polyethylene, ultra high molecular weight polyethylene, polypropylene, polyamide, polybutadiene terephthalate and polyethylene terephthalate, polyethylene naphtalate, polyvinyl alcohol, polyphenylidensulfide, polyisobutylene (PIB), polyurethane (PU), copolymers of these polymers and mixtures thereof.

It is preferred that the polymeric tapes have at least two layers. More preferably the polymeric tapes have at least 3 alternating layers and most preferably the polymeric tapes have at least 5 alternating layers.

In addition a resin may also be applied around the layered tapes with a doctor blade, by spraying, powder coating or leading the tapes through a polymer solution, dispersion or emulsion and the like. Said resin should exhibit a melting temperature lower than the temperature applied to the monolayers of polymeric tapes during consolidation to ensure optimal bonding of the tapes.

Bonding of the tapes and the respective monolayers may also be achieved by a substrate layer between each monolayer. The substrate layer may be in the form of a film, scrim or the like. Preferably the substrate layer consists of a polymeric material with a melting point lower than the melting point of the polymeric tapes. The substrate layer may also function as reinforcing material. A scrim or nonwoven would be preferred as reinforcing material.

Polymeric tapes comprising only one polymeric material may also be consolidated without any additional resin material. The monolayers are in this case consolidated at a temperature range just below the melting temperature of the polymeric tapes. Such a method is known in the art as "hot compaction".

The polymeric tapes may also be bonded by a pressure sensitive adhesive.

The term tape as used in the context of the present invention means flexible, elongate elements of essentially uniform width and thickness that can have any shape except a circular shape. The width/height ratio of the tapes is at least 2, preferably at least 5 and more preferably at least 20. Preferably the tapes can be positioned in a side by side relationship with lateral sides of adjacent tapes being essentially parallel. The tapes may be derived from a slit film. The tapes may also be monofilaments. The tapes used in the process according to the present invention may have various cross sections.

Preferably the tapes according to the process of the present invention essentially have a quadrangular cross section.

The term quadrangular encompasses tapes with rectangular cross section, parallelogram shaped cross section or trapezoid cross section. Tapes with parallelogram shaped cross section are of course positioned with the lateral sides of adjacent tapes essentially abutting each other and being essentially parallel. The same applies to tapes with trapezoid cross section. Such positioning can be achieved with tapes having trapezoid cross section by aligning the tapes in an alternating manner where adjacent tapes are turned upside down.

In another preferred embodiment the tapes essentially have a triangular cross section. Again, the triangular tapes of one monolayer are positioned with the sides of adjacent tapes essentially abutting each other and being essentially parallel. This is also achieved by aligning the tapes in an alternating manner where adjacent tapes are turned upside down, i.e. the triangular tape with a cross section having a base side and two sides forming a vertex opposite to the base is so positioned that adjacent to a base side of one tape is the vertex opposite the base of the next triangular tape.

In order to obtain laminates with the required tensile strength it is preferred that the polymeric tapes are drawn with a draw ratio of at least 1:5, more preferably the polymeric tapes are drawn with a draw ratio of at least 1:15. Draw ratios of 1:50 or more are especially preferred.

Quadrangular tapes that are monofilaments may preferably be 1.5 mm to 10 mm in width and 20 µm to 1500 µm thick. Quadrangular tapes made by slitting a film may be 2 mm to 300 mm wide and—depending on the number of layers—1 µm to 1000 µm, preferably 4 µm to 50 µm thick. Tapes with triangular cross section may be 2 to 10 mm in width and thickness.

The present invention further relates to a laminate comprising at least two monolayers of polymeric tapes, characterised in that the direction of the polymeric tapes is the same in every monolayer and that the polymeric tapes of each monolayer are offset to the tapes of the adjoining monolayer stacked above or below a monolayer. Such laminates are lightweight and show exceptional impact strength.

Another object of the present invention is to manufacture a rigid panel built up of individual laminates, which panel has specific strength and weight characteristics.

This object is achieved by a process for producing a panel built up of individual laminates according to the invention or laminates being produced in a process according to the invention, at least two laminates are placed one on top of another and consolidated using pressure and heat to form a panel. In the process for producing a panel up to 1000 laminates, preferably up to 600, more preferably up to 200 laminates may be placed on top of another to form a panel.

The object is further achieved by a panel built up of individual laminates according to the invention or laminates being produced in a process according to the invention, said panel comprising at least two laminates that lie on top of another with the laminates being meltbonded preferably over essentially their whole surface area.

The laminates used in the process for producing a panel or the laminates of the panel may be placed on top of another in such a way that the polymeric tapes building the laminates all lie in the same direction. In a preferred embodiment at least one of the laminates placed on top of another is turned relative to the adjoining laminate placed above or below that laminate, more preferably at least one of the laminates is turned by 90° relative to the adjoining laminate placed above or below that laminate thus obtaining higher tensile strength in transverse direction of the panel. The laminates may also be stacked in an alternating manner of 0° and 90°. The panel may comprise an identical number of laminates with 0° and turned by 90°. It is, however, also sufficient if only the top and bottom laminate are being turned by 90° relative to the other laminates.

Suitable configurations may be e.g. 0-90-0-90-0, 0-90-90-90-90-0, 0-90-90-90, 0-0-0-0-90. Another possible configuration could be 0-45-90-135-0. In this configuration the laminate indicated with "45", is turned by 45° relative to the laminate indicated with "0". The remaining laminates are turned analogously by 90°, 135° and 0°.

The panels according to the invention take up the impact energy to which they are subjected with a high level of energy absorption.

In a special embodiment it is in particular preferable if the present panel is provided with one or more layers of an impact resistant material, which impact-resistant material has preferably been selected from one or more of materials from the group consisting of metals, metal alloys, glass, basalt fibre, glass fibre, ceramics or other materials which can be used for antiballistic applications like aramid or ultrahigh molecular weight polyethylene fibres. The layer of impact resistant material may be provided on one or on both surface sides. The impact resistant material may also be sandwiched between individual laminates even in an alternating manner of laminates according to the invention and layers of an impact resistant material.

Yet another object of the present invention is to provide a special use of such a panel.

Such use may be civil engineering structures, hulls for mobile homes or caravans, garage doors, pick up truck boxes or horse traitors. The rigid panels according to the invention are especially suitable for so called hard ballistic applications. Such hard ballistic applications may be walls, doors, plates, hard ballistic inserts for vests, military applications such as combat helmets, body shields, armor panels for ground vehicles, aeroplane bodies and aeroplane doors or boats.

Furthermore, the present laminate can be used in SRP (self reinforced polymer) products in which especially the bond from layer to layer is significantly improved, because of the intense contact of the present laminate with another laminate in comparison with the contact of one fabric with another fabric.

The invention is further illustrated by means of FIGS. 1, 2, 3 and 4.

FIGS. 1, 2, 3 and 4 should be considered as being exemplary. They are not to be taken in a limiting sense.

BRIEF DESCRIPTION OF THE DRAWINGS

FIG. 1a shows a tape consisting of one polymeric material. Such tapes could be used to form a laminate without any additional resin or substrate layer by hot compaction. As an alternative a sheath material could be applied around the tape before pretensioning or positioning.

FIG. 1b shows a tape comprising a polymeric core which is surrounded by a polymeric sheath material. In case monofilaments are used as tapes, the sheath may be applied to the core material by spinning the sheath along with the core. As disclosed above a sheath material could also be applied around the tape before pretensioning or positioning. The latter method could be applied to slit films or monofilaments.

FIG. 1c shows a tape with a layered structure having alternating layers of a polymeric material. Such tapes would be derived from a slit film. The tapes could of course comprise more than 3 layers as shown in FIG. 1c. The tapes used in a process according to the invention could also comprise 5, 7, 9 or more layers.

FIG. 1d shows a tape with three layers as a core surrounded by a sheath.

FIG. 1e shows a tape with two sheath around a core. Such a structure might be necessary to achieve good bonding of the outer sheath material to the core material. The inner sheath functions as a primer providing the required surface to which the outer sheath material and the core material may adhere.

Figure 1:
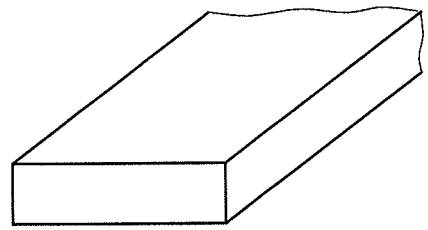
FIG. 1 shows sections of preferred embodiments of tapes that can be used in the process according to the invention or that can be used for laminates according to the invention.
Figure 1:
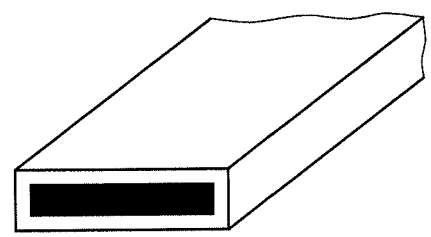
Figure 1:
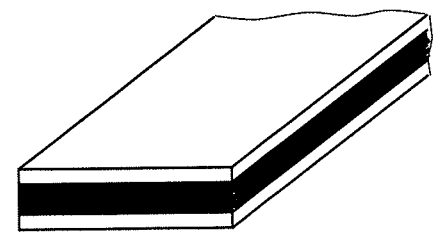
Figure 1:
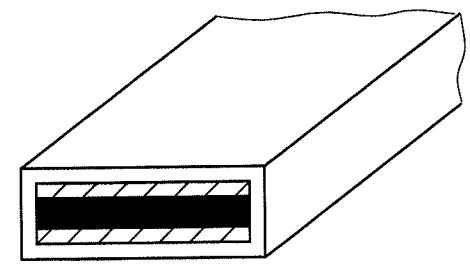
Figure 1:
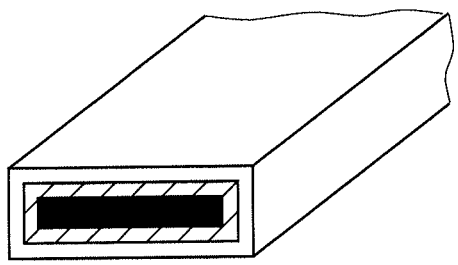
Figure 2:
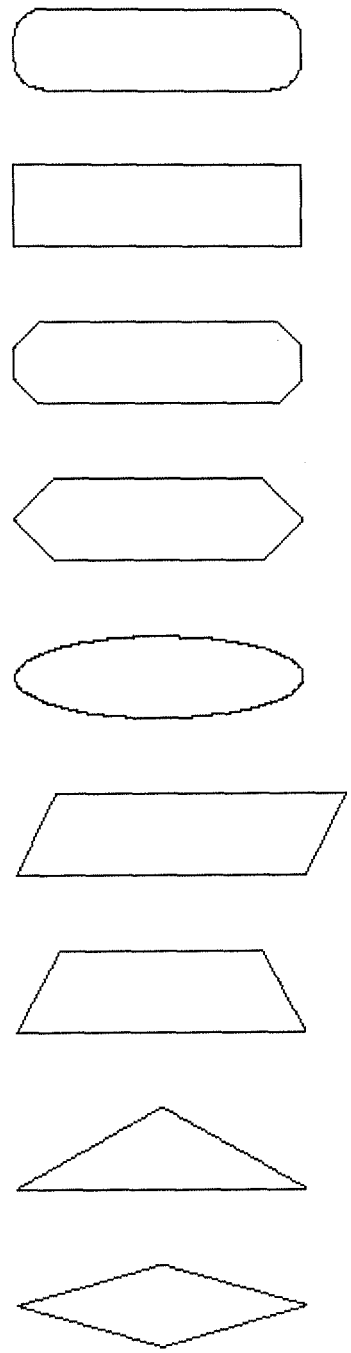
FIG. 2 shows possible cross sections of tapes that can be used in the process according to the invention or that can be used for laminates according to the invention.
Figure 3:
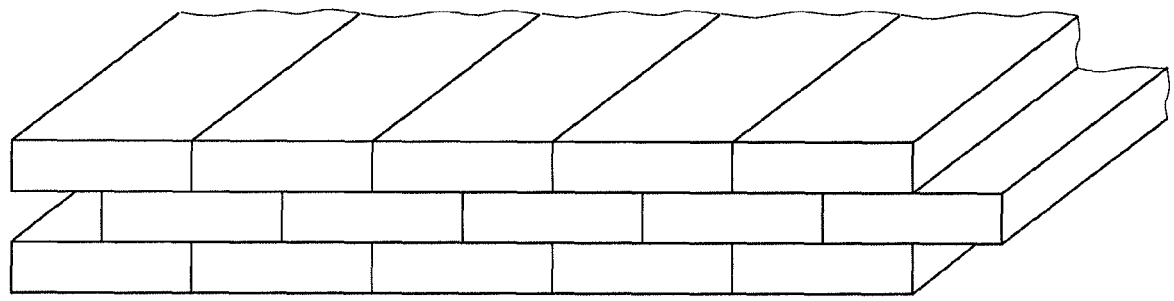
FIGS. 3 and 4 show exemplary sections of laminates according to the invention. The laminate shown in FIG. 3 comprises 3 layers of essentially rectangular tapes with the tapes of each monolayer being offset to the tapes of adjoining monolayers. The laminate shown in FIG. 4 comprises 3 layers of essentially triangular tapes with the triangular tapes of one monolayer are positioned with the sides of adjacent tapes essentially abutting each other and being essentially parallel. The joints between adjacent tapes of one monolayer are completely covered by the tapes of the adjoining monolayer above or below that layer.
Figure 4:
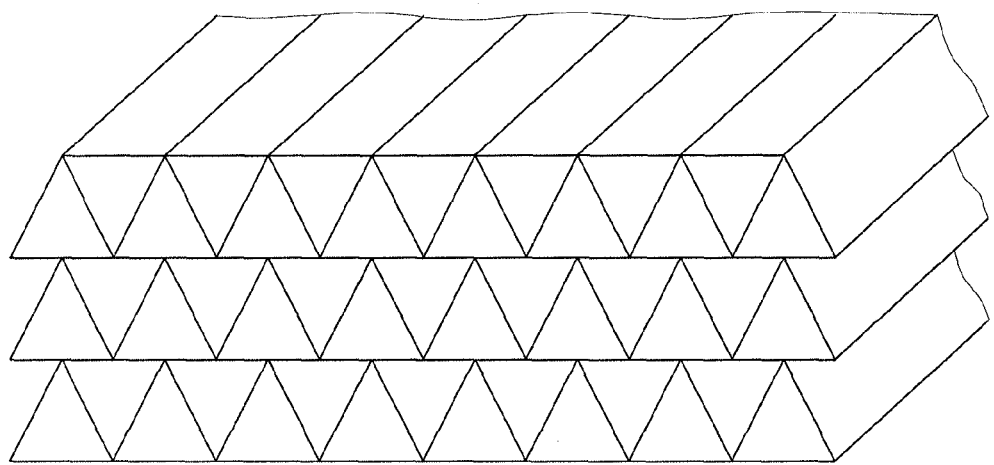

What is claimed is:

1. A method for providing hard ballistic protection comprising using a panel to resist hard ballistic impact, the panel being formed from at least two laminates, the at least two laminates being placed on top of another and subjected to pressure and heat to form the panel, and wherein each laminate independently being built of at least two monolayers of polymeric tapes, the polymeric tapes having a tensile strength of at least 200 MPa, the polymeric tapes having a sheath/core structure and the sheath material being applied to the core material in a later step with a doctor blade, by spraying powder coating or leading the tapes through a polymer solution, dispersion, the process of forming the laminate comprising the steps of forming a first monolayer of polymeric tapes by pretensioning the polymeric tapes and subsequently positioning the polymeric tapes under tension in a unidirectional, parallel manner, forming at least a second monolayer over the first monolayer in the same manner the first monolayer is formed, thereby stacking the at least two monolayers of polymeric tapes in such a way that the polymeric tapes in the first monolayer are oriented in the same direction as the polymeric tapes in the second monolayer and that the polymeric tapes of each monolayer are offset to the tapes of the adjoining monolayer above or below that monolayer consolidating the thus stacked monolayers of polymeric tapes to obtain the laminate.

\* \* \* \* \*